United States Patent
Rea (10) Patent No.: US 10,118,686 B2
(45) Date of Patent: Nov. 6, 2018

(54) WING ROOT INSERT SYSTEM FOR AN AIRCRAFT FAMILY

(71) Applicant: The Boeing Company, Chicago, IL (US)

(72) Inventor: Perry Nicholas Rea, Everett, WA (US)

(73) Assignee: The Boeing Company, Chicago, IL (US)

( * ) Notice: Subject to any disclaimer, the term of this patent is extended or adjusted under 35 U.S.C. 154(b) by 869 days.

(21) Appl. No.: 13/628,117

(22) Filed: Sep. 27, 2012

(65) Prior Publication Data

US 2014/0084110 A1 Mar. 27, 2014

(51) Int. Cl.
*B64C 1/26* (2006.01)

(52) U.S. Cl.
CPC ........... *B64C 1/26* (2013.01); *Y10T 29/49622* (2015.01)

(58) Field of Classification Search
CPC ........................................................ B64C 1/26
USPC ................. 244/131, 45 R, 54, 55, 123.1, 124
See application file for complete search history.

(56) References Cited

U.S. PATENT DOCUMENTS

| | | | | | |
|---|---|---|---|---|---|
| 2,090,038 | A | * | 8/1937 | Goddard | B64C 1/06 244/119 |
| 2,211,089 | A | * | 8/1940 | Berlin | B64C 3/00 244/117 R |
| 2,406,506 | A | * | 8/1946 | Northrop | B64C 39/10 244/13 |
| 2,412,646 | A | * | 12/1946 | Northrop | B64C 39/10 244/13 |
| 2,412,647 | A | * | 12/1946 | Northrop | B64C 39/10 244/13 |
| 2,430,438 | A | * | 11/1947 | Watter | B64C 3/00 244/124 |

(Continued)

FOREIGN PATENT DOCUMENTS

| | | |
|---|---|---|
| CN | 101668679 | 3/2010 |
| FR | 2920407 | 3/2009 |

(Continued)

OTHER PUBLICATIONS

PCT International Search Report and Written Opinion dated Dec. 11, 2013 in PCT/US2013/057168.

(Continued)

*Primary Examiner* — Tien Q Dinh
*Assistant Examiner* — Michael A. Fabula
(74) *Attorney, Agent, or Firm* — Miller, Matthias & Hull LLP (57) ABSTRACT

A single, common, fuselage and wing design of an aircraft structure provides for two different aircraft models or configurations. A fuselage (12) has a center section cutout area (212). Each wing (16) has an airfoil over substantially its entire span. In one configuration (2A), a center section component (212), such as a wingbox, is inserted into the center section cutout and the wings are connected to opposing sides of the center section component by a side-of-body join. In another configuration (2B), the wings are moved inwardly, joined to the fuselage, and also joined to each other in a centerline join at the centerline (218) of the aircraft wherein a portion (16A) of the airfoil of each wing is then inside the fuselage. Different flaps (210, 220), spacers (222), and/or different engine mount locations (402, 404) may be provided for the wings for the two configurations.

24 Claims, 5 Drawing Sheets

(56) References Cited

U.S. PATENT DOCUMENTS

| | | | |
|---|---|---|---|
| 2,482,798 A * | 9/1949 | Rheinfrank, Jr. | B64C 3/00 156/245 |
| 2,927,749 A * | 3/1960 | Brownell | B64C 3/00 114/271 |
| 2,973,165 A * | 2/1961 | Davidson | B64C 23/005 244/123.8 |
| 4,148,450 A | 4/1979 | Neuhierl | |
| 4,417,708 A * | 11/1983 | Negri | B64C 3/40 244/45 R |
| 4,494,940 A | 1/1985 | Gretz | |
| 5,039,032 A * | 8/1991 | Rudolph | B64C 3/10 244/124 |
| 5,314,142 A * | 5/1994 | Rao | B64C 3/14 244/204 |
| 5,645,250 A * | 7/1997 | Gevers | B64C 1/00 244/101 |
| 5,735,486 A * | 4/1998 | Piening | B64C 3/20 244/124 |
| 5,909,858 A * | 6/1999 | Hawley | B64C 3/00 244/130 |
| 6,065,720 A * | 5/2000 | Ash | B64F 5/0009 244/118.2 |
| 6,070,831 A * | 6/2000 | Vassiliev | B64C 1/00 244/117 R |
| 6,190,484 B1 | 2/2001 | Appa | |
| 6,237,873 B1 * | 5/2001 | Amaoka | B64C 3/00 244/123.7 |
| 6,478,253 B1 * | 11/2002 | Seidel | B64C 1/00 244/118.1 |
| 6,568,632 B2 * | 5/2003 | Page | B64C 1/0009 244/120 |
| 7,093,798 B2 * | 8/2006 | Whelan | B64C 1/0009 244/120 |
| 7,234,667 B1 * | 6/2007 | Talmage, Jr. | B64C 1/00 244/120 |
| 7,398,586 B2 * | 7/2008 | Prichard | B29C 33/307 244/123.1 |
| 7,887,009 B2 * | 2/2011 | Keeler, Jr. | B64C 1/26 244/119 |
| 8,056,853 B2 * | 11/2011 | Eisentraut | B64C 3/54 244/123.1 |
| 8,371,532 B2 * | 2/2013 | Williams | B64C 1/26 244/123.7 |
| 8,770,518 B2 * | 7/2014 | Guittard | B64C 1/26 244/120 |
| 8,899,520 B2 * | 12/2014 | Barmichev | B64C 1/00 244/119 |
| 2002/0153454 A1 * | 10/2002 | Seidel | B64C 1/00 244/119 |
| 2003/0222170 A1 * | 12/2003 | Wojciechowski | B64F 5/0009 244/10 |
| 2004/0195464 A1 * | 10/2004 | Vassberg | B64C 3/28 244/216 |
| 2005/0017126 A1 * | 1/2005 | McLean | B64C 3/28 244/35 A |
| 2005/0166967 A1 | 8/2005 | Howe | |
| 2005/0236524 A1 * | 10/2005 | Sarh | B64C 3/18 244/124 |
| 2008/0105786 A1 * | 5/2008 | Childs | B64C 3/182 244/124 |
| 2008/0251641 A1 * | 10/2008 | Sprenger | B64C 1/068 244/118.5 |
| 2009/0084899 A1 | 4/2009 | Kismarton et al. | |
| 2009/0321575 A1 | 12/2009 | Barroso Vloedgraven et al. | |
| 2010/0170986 A1 | 7/2010 | Lafly et al. | |
| 2010/0170987 A1 * | 7/2010 | Meyer | B64C 7/00 244/120 |
| 2011/0046821 A1 * | 2/2011 | Grabowsky | B64C 3/56 701/3 |
| 2011/0147521 A1 * | 6/2011 | Delahaye | B64C 1/26 244/119 |
| 2011/0174928 A1 | 7/2011 | Martinez Fernandez et al. | |
| 2012/0160968 A1 * | 6/2012 | Barmichev | B64C 1/00 244/45 R |
| 2012/0234975 A1 * | 9/2012 | Timm | B64C 7/00 244/130 |
| 2014/0061392 A1 * | 3/2014 | Karem | B64C 29/0033 244/7 R |
| 2015/0375860 A1 * | 12/2015 | Hong | B64C 29/0033 244/12.4 |

FOREIGN PATENT DOCUMENTS

| | | |
|---|---|---|
| GB | 2 435 457 | 8/2007 |
| JP | 2009539702 A | 11/2009 |
| JP | 2010527832 A | 8/2010 |

OTHER PUBLICATIONS

First Chinese Office Action from CN Application No. 201380041431.6 dated Apr. 29, 2016, 4 pages.
Second Chinese Office action from CN Application Serial No. 201380041431.6 dated Jan. 4, 2017, 5 pages.
Office Action for related Japanese Application No. JP2015-534505; report dated Jun. 12, 2017.
Office Action for related Japanese Application No. JP2015-534505; report dated Feb. 2, 2018.

\* cited by examiner

WING ROOT INSERT SYSTEM FOR AN AIRCRAFT FAMILY

BACKGROUND

Aircraft design and testing is an expensive and time-consuming process. A typical process is to develop a first model of the aircraft, to construct a prototype, and then test the prototype. If a larger payload carrying capacity and/or a longer flight distance are later needed for a particular market then a standard technique is to modify the wing, such as by a span extension of the outboard wing or a trailing edge extension on the wing. These approaches are costly and are also very limited in the benefit that they can provide. Alternatively, the prototype may be for a larger payload capacity and/or long flight distance, and then a shorter flight distance and/or payload capacity is later needed for another market, so the wing is modified to be shorter. Either way, it is often necessary to completely redesign and test the wings and/or the fuselage to achieve the desired distance and/or payload capacity, and such redesign and testing is also an expensive process. It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a single, common, fuselage and wingset design which can be used for at least two different members of an aircraft family. According to one aspect of the disclosure an aircraft structure includes a common fuselage having a center section cutout area and a common pair of wings (a wingset), the fuselage and the wingset being designed for use in two different configurations without substantial modification or further testing of either.

In one configuration, such as a shorter-range or lower-payload configuration, the wings are inserted into and joined to the fuselage, and the wing roots are joined together in a centerline join at the centerline of the fuselage in the center section cutout. Each wing has an airfoil which may vary over the span of the wing, but which extends over substantially the entire span of the wing. The two wings in the wingset are substantially mirror images of each other. Part of the wing is inside the fuselage so part of the airfoil of the wing is actually inside the fuselage and does not provide lift for the aircraft.

In another configuration, such as a longer-range or higher-payload configuration, a center section component is inserted into the center section cutout area of the fuselage and joined to fuselage, and the wing roots are joined in a side-of-body join to the center section component. Thus, the full span of each wing provides lift for the aircraft. The inserted center section component, such as a wingbox, may provide additional fuel and/or cargo storage space.

According to another aspect of the disclosure an aircraft structure includes a fuselage having a center section cutout area and a single wing. The fuselage and the wing are designed for use in two different configurations without substantial modification or further testing of either. For a shorter-range or lower-payload configuration the single wing may be inserted into, and joined to, the fuselage. For a longer-range or higher-payload configuration the single wing may also be divided into two wing parts at its centerline, and the two parts may be joined in a side-of-body join to a center section component which has been inserted into and joined to the fuselage. The single wing has an airfoil which may vary over the span of the wing, but extends over substantially the entire span of the wing. The two parts are substantially mirror images of each other.

According to another aspect, there are two different fairing designs: one design for use with the centerline join configuration, and another design for use with the side-of-body join configuration.

According to another aspect, the wing roots are moved inwardly with respect to the fuselage for the centerline join configuration or moved outwardly for the side-of-body join configuration.

This single, common, fuselage and wing design conveniently provides for two different configurations or models in an aircraft family, such as a short-haul or smaller payload model and a longer-haul or higher-payload model and provides a substantial savings in time and costs as compared to designing two different fuselages and two different wingsets for the two different configurations.

The features, functions, and advantages that have been discussed can be achieved independently in various embodiments of the present disclosure or may be combined in other embodiments, further details of which can be seen with reference to the following description and drawings.

DETAILED DESCRIPTION

The following detailed description is directed to systems and methods for providing a single, common, fuselage and wing design usable for different configurations or models in an aircraft family. In the following detailed description, references are made to the accompanying drawings that form a part hereof, and which are shown by way of illustration, specific embodiments, or examples. Like numerals represent like elements through the several figures. The terms configuration and model are used interchangeably herein unless the context requires otherwise.

Figure 1:
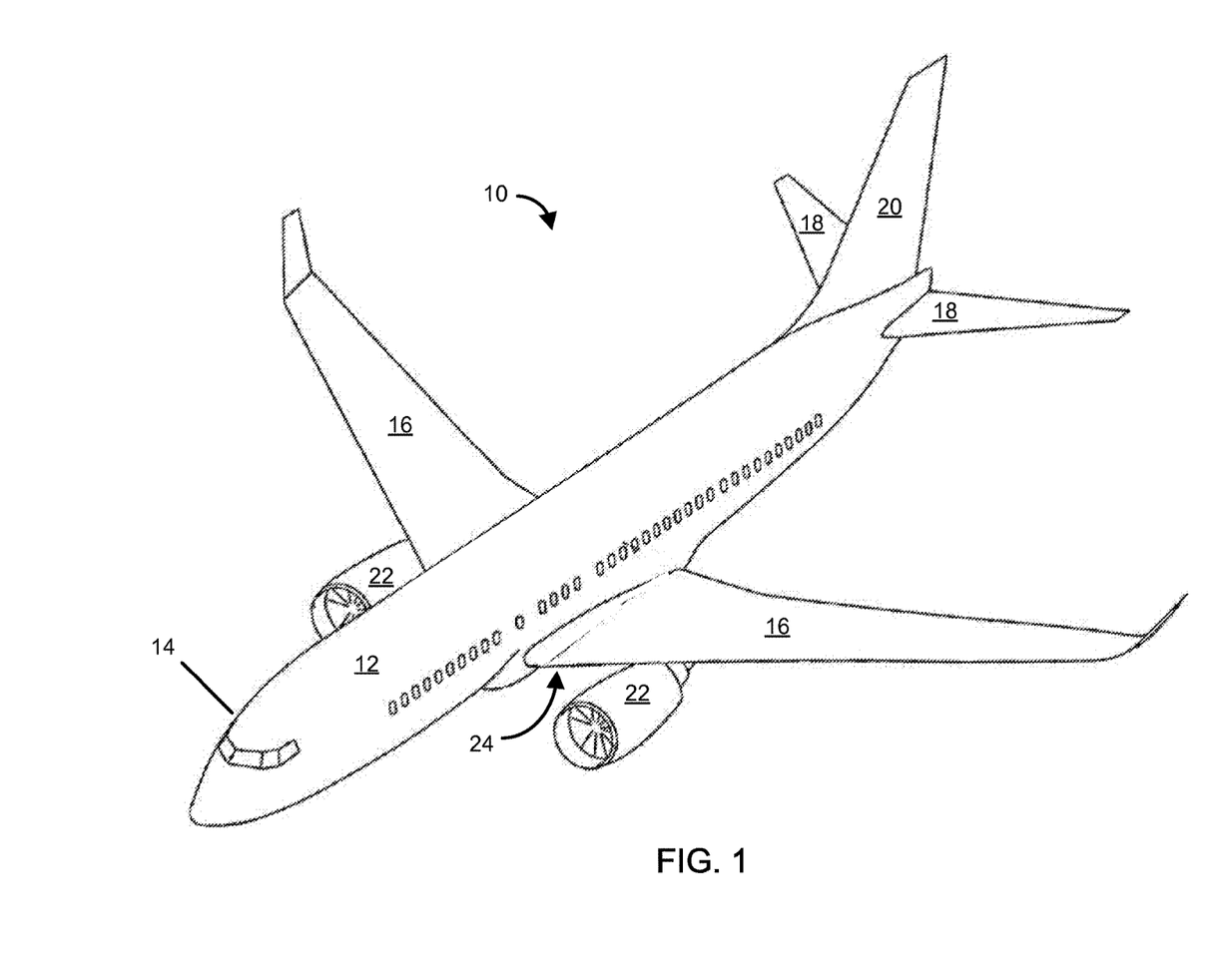
FIG. 1 is a perspective view of an exemplary aircraft.

FIG. 1 is a perspective view of an exemplary aircraft 10, showing a fuselage 12, a cockpit 14, a pair of wings 16, a pair of horizontal stabilizers 18, a vertical stabilizer 20, and a pair of engines 22. Not expressly shown, but present as indicated by numeral 24, are landing gear which are deployed for takeoff, landing, standing, parking, and taxiing, and which, depending upon the aircraft design, are stowed for flight inside either the fuselage 12 or the wings 16. It should be appreciated that the concepts described herein are not limited to the exemplary aircraft of FIG. 1, but also apply to other aircraft which may have a different number of engines, different stabilizers, a different number of stabilizers, and other characteristics which are different from the characteristics of the exemplary aircraft shown. Also, the concepts described herein are not limited to aircraft wherein the wing is used in the low-side-of-body mount shown in FIG. 1, but are also useful in a middle-side-of-body mount and a high-side-of-body mount.

Figure 2A:
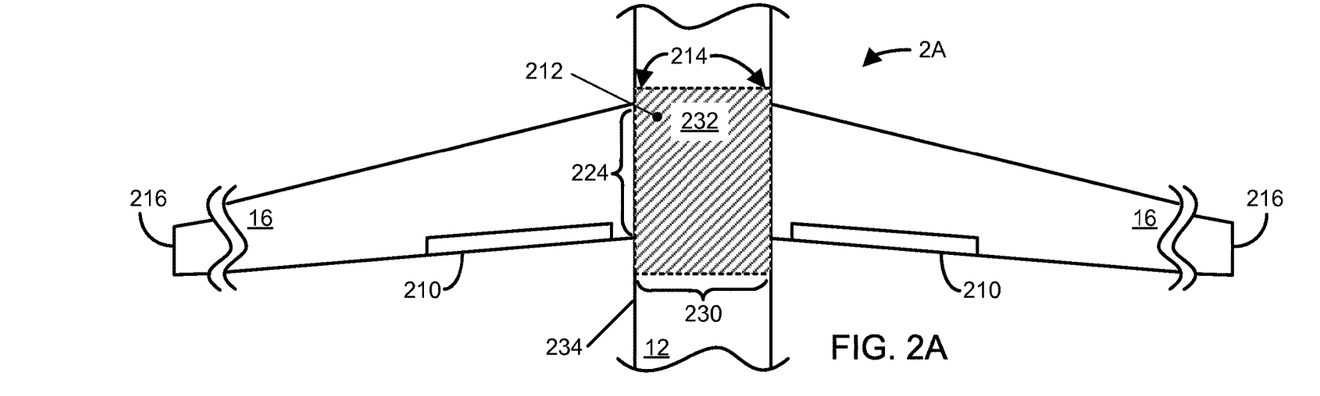
FIGS. 2A and 2B illustrate an exemplary wing placement in different configurations in an aircraft family having a common fuselage and wingset.
Figure 2B:
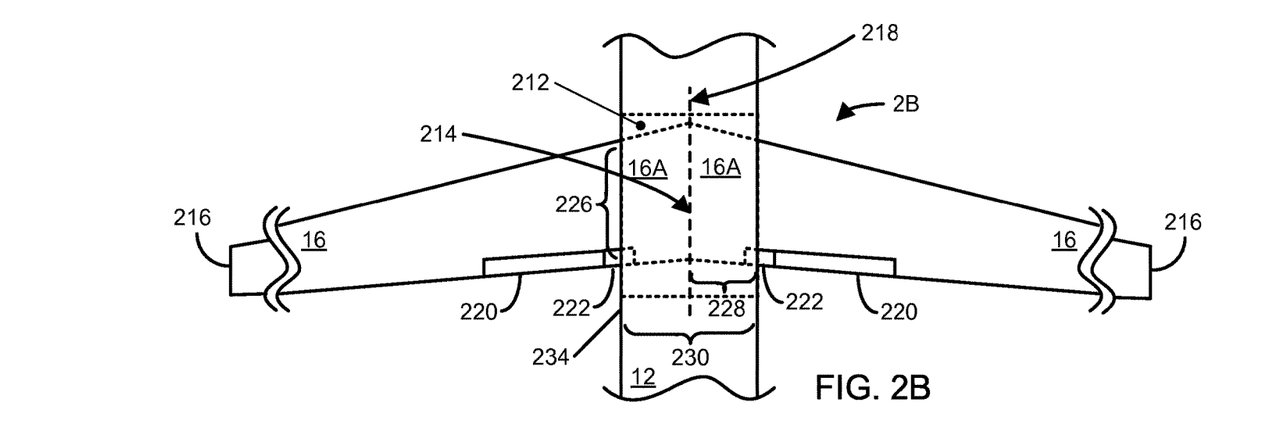

FIGS. 2A and 2B illustrate an exemplary wing placement in different configurations in an aircraft family. The aircraft structure used for the family has a single, common, fuselage and single, common, wingset. The common fuselage 12 has a center section cutout 212. FIG. 2A shows a configuration 2A wherein a center section component 232 has been inserted into the center section cutout 212 and joined to the fuselage 12 in a conventional manner. The center section component 232 is indicated as the shaded area in FIG. 2A. Each wing 16 of the common wingset in the aircraft structure is joined at its root 214 to the center section component 232 in a conventional side-of-body join. The wings 16 have a size, shape and span commensurate with the weight of the fully loaded aircraft, engine power, desired cruising range or time, runway length, etc., and have an airfoil along substantially their entire spans. The term "wingspan" is commonly used in the aircraft industry to mean the linear distance between the extremities of an airfoil, such as the linear distance between the tips 216 of wings 16, and therefore includes the width 230 of the fuselage 12 where the wings 16 are connected. The term "effective wingspan", as used herein, does not include the width 230 of the fuselage 12. The effective wingspan in configuration 2A is thus twice the span of an individual wing 16, that is, twice the distance between the wing root 214 and the tip end 216 of a wing 16. Also shown are the flaps 210 on the wings 16. The flaps have a predetermined length to provide a size and span commensurate with the size and span of the wings 16, the weight of the fully loaded aircraft, engine power, runway length, etc. The full effective wingspan thus provides for a larger payload, a longer range or cruising time, the use of shorter runways, and/or better fuel consumption. In addition, the center section component 232 may be or include a wingbox which includes a fuel tank so as to provide for a longer range or cruising time, or a cargo area to provide more payload carrying space if fuel considerations permit, or a combination thereof.

FIG. 2B shows another configuration 2B but a center section component 232 is not inserted into the center section cutout 212 so the center section cutout 212 is mostly empty space. In this configuration the same common fuselage and wingset design is used for the aircraft structure as in configuration 2A, but the wings are joined to the fuselage 12 in an conventional manner and also joined to each other in a centerline join, that is, the wing roots 214 are joined to each other along the centerline 218 of the aircraft. In this configuration a portion 16A of the wing 16 is now inside the fuselage 12. Note that a portion 16A of the wing 16 that was previously outside of the fuselage 12 is now inside the fuselage 12 so the effective wingspan is now shorter by up to twice the width 228 of the portion 16A. The width 228 of portion 16A, in the exemplary configuration shown, is approximately one-half of the width 230 of the fuselage 12 at the point where the wings are joined together. Note that portion 16A, being part of the original design of the wing 16, still has an airfoil, even though it is inside the fuselage 12. In this configuration, the two wings 16 are considered to be joined together even if they are also, or instead, joined to a component or components (not shown) which are primarily structural in nature, such as but not limited to plus chords (p-chords) and a centerline keel, as long as any such component which may be between the wing roots 214 is thin as compared to the width of the fuselage at that point. A conventional wingbox, which may include a center wing tank or a cargo bay, is not considered to be thin.

It will be appreciated that, depending upon the location and span of the flaps in configuration 2A, the side 234 of the fuselage 12 might interfere with the operation of the flaps 210 in configuration 2B. Therefore, preferably, shorter flaps 220, having a different, shorter predetermined length, and spacers 222 are used. The spacers 222 may be fixed, non-moving flaps. Preferably, but not necessarily, the span of a flap 220 is as great as possible without interference with the side 234 of the fuselage 12. It is preferable that the span of a spacer 222 is sufficient to preserve the airfoil of the wing which is outside of the fuselage 12, and may be such that the combined lengths of the shorter flap 220 and its spacer 222 is approximately the same length as the longer flap 210.

This common wing and fuselage design described herein thus provides for and allows the use of the same wing 16 and the same fuselage 12 in two configurations: configuration 2A where a center section component 232 is inserted into the center section cutout 212 and the wing roots 214 are connected to the center section component 232 in a side-of-body join; and configuration 2B where the center section cutout 212 is essentially empty and the wing roots 214 are connected to each other in a centerline join. Thus, two different configurations 2A and 2B can be manufactured by simply inserting, or not inserting, a center section component 232 into the center section cutout 212, positioning or moving the wing roots 214 inwardly or outwardly with respect to the fuselage 12, and joining the wings 16 either to each other in a centerline join or to the center section component 232 in a side-of-body join. This single, common, fuselage and wing design may be considered to be wing root retraction (configuration 2A) or wing root insertion (configuration 2B).

A pair of wings 16 may be originally designed and constructed as separate components which can be used in both configurations. Alternatively, a single wing 16 may be initially designed and constructed for use in configuration 2B the centerline of the wing being coincident with the centerline 218 of the aircraft. In this case the center portion 16A (left), 16A (right), of the wing 16 is inside the fuselage 12. The single wing may be divided along its centerline into two wing parts 16 (left), 16 (right), for use in configuration 2A. In either case, the same, common, wing design and fuselage design are used, but different flaps 210, 220 and/or spacers 222 may be used.

Consider now some of the benefits of using a common fuselage and wing design for both configurations. The aircraft 10 may be initially designed for short-haul or light payload trips, so configuration 2B, with a centerline join, a shorter effective wingspan, may be initially used. Now assume, for example, that it is desired to provide a different model of the aircraft 10 for use on long-haul, heavier payload, and/or shorter-runway trips. In this case configuration 2A, which will provide for a longer effective wingspan, can be produced by inserting a center section component 232 and joining the wings 16 to the center section component 232 by a side-of-body join.

Alternatively, assume that the aircraft 10 is initially designed for long-haul, heavier payload, and/or shorter-runway trips, so configuration 2A, with the center section component 232 and a longer effective wingspan, and extra fuel or payload capacity, may be initially used. Now assume that it is desired to provide a different model of the aircraft 10 for use on short-haul or light payload trips. In this case configuration 2B, with a centerline join, and without the center section component 232, will provide for a shorter effective wingspan, thus increasing the efficiency and/or the maneuverability of the aircraft 10.

Thus, the same, common, fuselage 12 and wing 16 design provides for two different configurations in an aircraft family: a short-haul/lower payload model and a longer-range/higher payload model. Accordingly, redesign of the fuselage 12 and/or the wings 16 is avoided, thereby reducing design, development, and manufacturing costs, and also reducing the time to provide a new model with different capabilities to the market or a buyer. As mentioned herein, different flaps 210, 220 and/or spacers 222 may be used.

It is also possible, although not shown, to partially insert the wing 16 into the fuselage 12, so that the width 228 of the portion 16A is less than one-half of the width 230 of the fuselage 12, for example, one-quarter of that width, and a narrower center section component 232 is inserted in the center section cutout area 212. The flap 220 and spacer 222 sizes are adjusted accordingly. This provides a third configuration which will have different range, payload capacity, and other abilities. Thus, although two configurations may be adequate, more configurations may be added to accommodate the needs of a customer and/or a market.

Figure 3A:
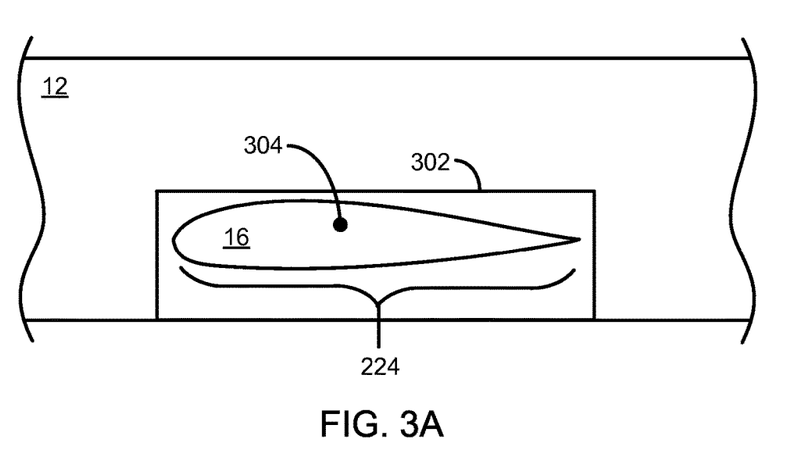
FIGS. 3A and 3B illustrate exemplary fairings for two different exemplary configurations in the aircraft family.
Figure 3B:
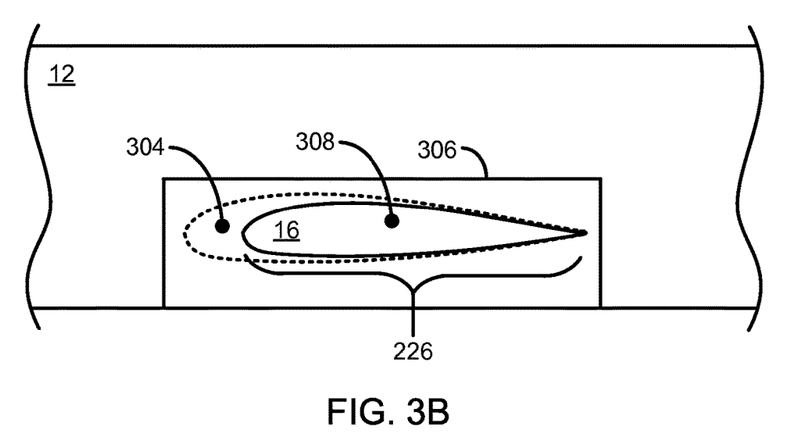

FIGS. 3A and 3B illustrate exemplary fairings for two different exemplary configurations in the aircraft family. Typically, the size of the chord of a wing 16 decreases going from the wing root 214 to the tip end 216. The chord 224 of the wing 16 in configuration 2A will therefore be the chord of the wing root 214, but the chord 226 of the wing 16 in the centerline join of configuration 2B will be smaller. Therefore, two different fuselage-to-wing fairings 302, 306 are preferably used to accommodate the two different chord sizes, one for configuration 2A and another for configuration 2B.

FIG. 3A illustrates the chord 224 and a cross-sectional view of the airfoil 304 of a wing 16, and associated fairing 302, for the side-of-body join configuration 2A. The fairing 302 will therefore have an opening of a size to accommodate this chord 224 and airfoil 304 cross-section. FIG. 3B illustrates the chord 226 and a cross-sectional view of the airfoil 308 of a wing 16, and fairing 306, for the centerline join configuration 2B. The fairing 306 will therefore have an opening of a size to accommodate chord 226 and airfoil 308 cross-section. As an illustration of the different openings for the two configurations, the airfoil 304 of FIG. 3A is shown in dotted lines in FIG. 3B. It should be noted that the fairings 302, 306 are the same size in both configurations. That is, they both cover the cutout area 212 of the fuselage. The use of different fairings 302, 306 to accommodate the different wing chord and airfoil sizes of the two configurations 2A, 2B avoids the need to modify the fuselage for the two configurations.

Figure 4A:
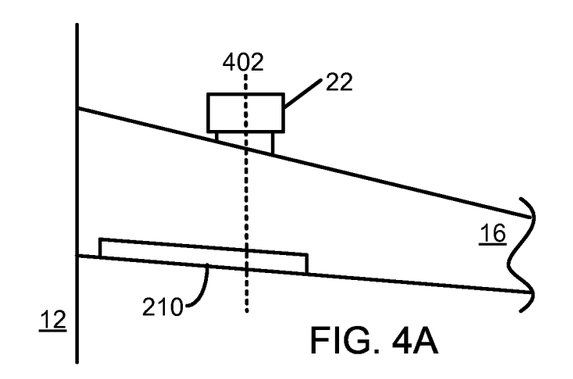
FIGS. 4A and 4B illustrate exemplary engine mounting locations.
Figure 4B:
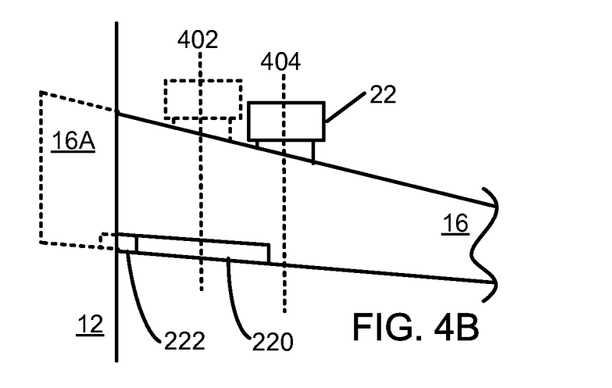

FIGS. 4A and 4B illustrate exemplary engine mounting locations. If the initial engine location design is for side-of-body join configuration 2A, such as the engine 22 being mounted on the wing 16 at position 402, which is at a predetermined distance from the wing root 214, then, because a portion 16A of the wing 16 is inside the fuselage 12 for centerline join configuration 2B, the engine 22 will be closer to the fuselage 12 if it remains mounted at the same position 402, as shown in dotted lines in FIG. 4B. This may increase the noise level inside the cabin of the aircraft 10 and/or adversely affect the performance of the aircraft 10. Therefore, in configuration 2B, the engine 22 is preferably located more outwardly along the wing 16 to a more appropriate position 404, which is at a different predetermined distance from the wing root 214. Alternatively, if the initial design is for the centerline join configuration 2B then, when the wings are used in the side-of-body join configuration 2A, the engine 22 may be located more inwardly along the wing 16 to a more appropriate position.

The exact location of positions 402 and 404 will depend upon the characteristics desired for the aircraft. One appropriate position may be, for example but not limited to, a position in which the engine 22 is the same distance from the fuselage 12 as it was in configuration 2A, as shown by position 404. Of course, depending upon the characteristics desired for that model or configuration of the aircraft 10, a different position, either closer in, or farther out, than position 404 may be appropriate. In addition, if it is desired to avoid having two different engine mount positions, then a single engine mount position may be used, such as position 402, position 404, or a position between those two.

Figure 5:
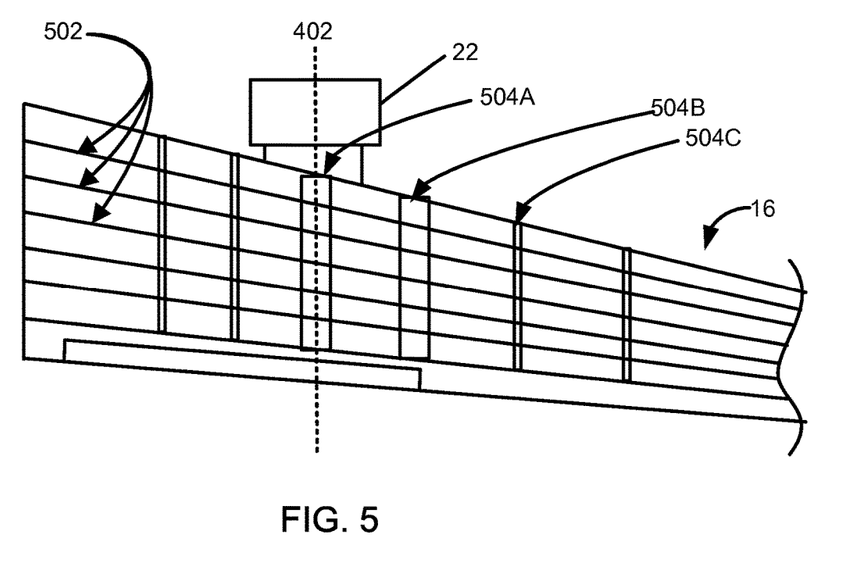
FIG. 5 illustrates an exemplary wing with spars and ribs.

FIG. 5 illustrates an exemplary wing 16 with spars 502 and ribs 504 (504A-504C). The number of spars 502 and ribs 504 shown for the wing 16 is merely for convenience of illustration and is not intended to indicate either an actual number or a desired number of spars and/or ribs. Likewise, the relative sizes and positions of the spars and ribs are merely for convenience of illustration. A rib or ribs, such as rib 504A, used as a mount for an engine 22, is preferably sized to accommodate the additional load and stress caused by the engine 22. It is possible, of course, to design all of the ribs to accommodate the load and stress caused by an engine 22 but this may unnecessary and adversely affect the weight, cost, and efficiency of the aircraft 10. Preferably, only a rib which is intended for mounting of an engine 22, such as rib 504A, is sized or reinforced to accommodate that additional load and stress. Therefore, if a single engine placement is used for both the configurations 2A and 2B, then only a single rib 504A need be strengthened to accommodate the engine 22.

Preferably, but not necessarily, two ribs 504A and 504B will be strengthened so that the engine 22 is mounted on, for example, the rib 504A for configuration 2A, and on the rib 504B for configuration 2B. Alternatively, a rib 504 may be positioned between the location for rib 504A and the position for rib 504B so as to provide for a single engine position which strikes an acceptable compromise on the desired performance characteristics of the aircraft 10.

Preferably, the landing gear 24 of FIG. 1 are stowed inside the fuselage 12 during flight. In an alternative implementation, the landing gear 24 may be stowed inside the wings 16. In this alternative implementation one landing gear 24 well location on the wing may be provided for one configuration and another landing gear 24 well location on the wing for another configuration or it may be possible, depending upon the aircraft weight and engine location, to use a single well location for the landing gear 24.

The wings 16 will have components which interface with aircraft components outside of the wings by electrical, oil, fuel, hydraulic and/or other lines. Preferably, the wings 16 are designed with such lines exiting the wing roots. If the centerline join of configuration 2B is used then the lines from the wings may be connected to lines going to such outside components in any acceptable manner. If the side-of-body join of configuration 2A is used then extenders may be attached to the lines from the wings so as to maintain connections with the outside components. Alternatively, the wings may be designed with the lines having a sufficient length to connect to the outside components for operation in configuration 2A and, if the aircraft is being manufactured for operation in configuration 2B, then the excess line may be appropriately trimmed and/or the excess line may be coiled or folded and then securely fastened.

It should be understood from the above disclosure that the concepts presented herein provide a solution to the high costs of modifying an aircraft for different payload capacities and/or ranges. The use of a common fuselage and wing design, including wing components which have an airfoil over their entire span, allows different aircraft configurations without incurring the costs associated with wing and/or fuselage redesign and testing.

Based on the foregoing, it should be appreciated that technologies for providing two different aircraft configurations, using a single, common, fuselage and wing design, by wing root insertion or retraction, have been disclosed herein. It is to be understood that the appended claims are not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An aircraft structure, comprising:
   a fuselage having a centerline, a center section cutout, and a fuselage width at the center section cutout, the center section cutout configured to accept a center section component;
   a pair of wings, each wing having a wing root, a wing tip, a leading edge from the wing root to the wing tip, a span equal to a distance from the wing root to the wing tip, and an airfoil over substantially its entire span, the wings being substantially mirror images of each other; and
   the fuselage and the wings being configured to be combined in a selected one of both a first configuration or a second configuration;
   wherein, in the first configuration, further comprising a center section component inserted into the center section cutout and joined to the fuselage, the wing roots being connected to opposing sides of the center section component by a side-of-body join, wherein an effective wingspan of the aircraft in the first configuration is equal to twice the span of one of the pair of wings; and
   wherein, in the second configuration, the center section component is not inserted into the center section cutout and the wings are connected to the fuselage and also connected at the wing roots to each other in a centerline join in the center section cutout, a portion of the airfoil of each wing being inside the fuselage, wherein the effective wingspan of the aircraft in the second configuration is equal to twice the span of one of the pair of wings minus the fuselage width, and wherein a single common wing design for the pair of wings is used in both the first configuration and the second configuration and the span of each of the pair of wings is the same in both the first configuration and the second configuration.

2. The aircraft structure of claim 1 wherein each wing has a first airfoil size at its root and a second airfoil size at an end of the portion distal from its root that is smaller than the first airfoil size, and further comprising a selected pair of either a first pair of fuselage-wing fairings or a second pair of fuselage-wing fairings;
   wherein the first pair of fairings is configured to accommodate the first airfoil size for use with the first configuration;
   wherein the second pair of fairings is configured to accommodate the second airfoil size for use with the second configuration; and
   wherein each of the selected fairings is connected to both the fuselage and the corresponding wing.

3. The aircraft structure of claim 1 comprising a pair of engines, each engine being mounted to a corresponding one of the pair of wings, wherein each wing comprises a first engine mount at a first predetermined distance from its wing root and to which the corresponding engine is mounted in the first configuration, and a second engine mount at a second, different predetermined distance from said wing root and to which the corresponding engine is mounted in the second configuration.

4. The aircraft structure of claim 3 wherein the second predetermined distance is different than the first predetermined distance by up to one-half of the fuselage width.

5. The aircraft structure of claim 1 wherein the center section component comprises a wingbox.

6. The aircraft structure of claim 1 wherein each wing has a flap, wherein the flap has a first predetermined length in the first configuration and a second predetermined length in the second configuration that is shorter than the first predetermined length.

7. The aircraft structure of claim 6 wherein, in the second configuration, the wing also has a spacer having a third predetermined length, said first predetermined length being approximately the same as the sum of said second and third predetermined lengths.

8. An aircraft structure, comprising:
   a fuselage having a centerline, a center section cutout, and a fuselage width at the center section cutout, the center section cutout configured to accept a center section component;
   a wing having oppositely disposed wing tips, a wingspan equal to a distance between the oppositely disposed wing tips, a centerline, and an airfoil over substantially its entire wingspan, the wing configured to allow it to be divided into a first part and a second part along its centerline, the first part and the second part being substantially mirror images of each other and comprising opposing wing roots at the centerline, wherein the first part and the second part each have a span from the wing root to the corresponding wing tip equal to one-half the wingspan of the wing;
   the fuselage and the wing configured to be combined in a selected one of either a first configuration or a second configuration;
   wherein, in the first configuration, further comprising a center section component inserted into the center section cutout and joined to the fuselage, the wing being divided into the first part and the second part, each of the first part and the second part having a leading edge extending from the wing root to the corresponding wing tip, the wing roots of the first part and the second part being connected to opposing sides of the center section component by a side-of- body join, wherein an effective wingspan of the aircraft in the first configuration is equal to twice the span of one of the first part and the second part; and
   wherein, in the second configuration, the center section component is not inserted into the center section cutout, the wing is inserted into the center section cutout and connected to the fuselage, the centerline of the wing being coincident with the centerline of the fuselage, and a center portion of the airfoil of the wing being inside the fuselage, wherein the effective wingspan of the aircraft in the second configuration is equal to twice the span of one of the first part and the second part minus the fuselage width, and wherein a single common wing design for the first part and the second part is used in both the first configuration and the second configuration and the span of the first part and the second part is the same in both the first configuration and the second configuration.

9. The aircraft structure of claim 8 wherein the wing has a first airfoil size at its roots and a second airfoil size at ends of a center portion that is smaller than the first airfoil size, and further comprising a selected pair of either a first pair of fuselage-wing fairings or a second pair of fuselage-wing fairings;
wherein the first pair of fairings is configured to accommodate the first airfoil size for use with the first configuration;
wherein the second pair of fairings is configured to accommodate the second airfoil size for use with the second configuration; and
wherein the selected pair of fairings is connected to both the fuselage and the wing.

10. The aircraft structure of claim 9 wherein the second configuration, the wing also has a pair of spacers, each spacer having a third predetermined length, said first predetermined length being approximately the same as the sum of said second and third predetermined lengths.

11. The aircraft structure of claim 8 comprising a pair of engines, wherein the wing comprises a first pair of engine mounts at a first predetermined distance from the wing root and to which the engines are mounted in the first configuration, and a second pair of engine mounts at a second, different predetermined distance from the wing root and to which the engines are mounted in the second configuration.

12. The aircraft structure of claim 11 wherein the second predetermined distance is different than the first predetermined distance by up to one-half of the fuselage width.

13. The aircraft structure of claim 8 wherein the center section component comprises a wingbox.

14. The aircraft structure of claim 13 wherein, in the second configuration, the wing also has a pair of spacers, each spacer having a third predetermined length, said first predetermined length being approximately the same as the sum of said second and third predetermined lengths.

15. A method of providing an aircraft structure, comprising:
providing a fuselage having a centerline, a center section cutout, and a fuselage width at the center section cutout, the center section cutout configured to accept a center section component; and
providing a pair of wings, each wing having a wing root, a wing tip, a leading edge from the wing root to the wing tip, a span equal to a distance from the wing root to the wing tip, and an airfoil over substantially its entire span, the wings being substantially mirror images of each other,
wherein the fuselage and the pair of wings are configurable in
a first configuration provided by inserting the center section component into the center section cutout and joining it to the fuselage, and attaching the wing roots to the center section component in a side-of-body join, wherein an effective wingspan of the aircraft in the first configuration is equal to twice the span of one of the pair of wings, and
a second configuration provided by not inserting the center section component into the center section cutout, inserting the wings into the center section cutout, connecting the wings to each other in a centerline join, and connecting the wings to the fuselage, wherein a portion of the airfoil of each wing is inside the fuselage, wherein the effective wingspan of the aircraft in the second configuration is equal to twice the span of one of the pair of wings minus the fuselage width, and wherein a single common wing design for the pair of wings is used in both the first configuration and the second configuration and the span of each of the pair of wings is the same in both the first configuration and the second configuration.

16. The method of providing an aircraft structure of claim 15 and further comprising:
providing a selected pair of either a first pair of fuselage-wing fairings or a second pair of fuselage-wing fairings;
wherein the first pair of fairings being configured to accommodate a first airfoil size for use with the first configuration;
wherein the second pair of fairings being configured to accommodate a second airfoil size that is smaller than the first airfoil size for use with the second configuration; and
further comprising connecting each of the selected fairings to both the fuselage and a corresponding wing.

17. The method of providing an aircraft structure of claim 15, wherein the aircraft comprises a pair of engines, the method further comprising providing each wing with a first engine mount at a first predetermined distance from its wing root and to which the corresponding engine is mounted in the first configuration, and a second engine mount at a second, different predetermined distance from said wing root and to which the corresponding engine is mounted in the second configuration.

18. The method of providing an aircraft structure of claim 15 wherein inserting the center section component comprises inserting a wingbox.

19. The method of providing an aircraft structure of claim 15 wherein providing a pair of wings further comprises providing each wing with a flap wherein, in the first configuration, the flap has a first predetermined length and, in the second configuration, the flap has a second predetermined length that is shorter than the first predetermined length, and further comprising providing each wing in the second configuration with a spacer having a third predetermined length, said first predetermined length being approximately the same as the sum of said second and third predetermined lengths.

20. A method of providing an aircraft structure, comprising:
providing a fuselage having a centerline, a center section cutout, and a fuselage width at the center section cutout, the center section cutout configured to accept a center section component; and
providing a wing having oppositely disposed wing tips, a wingspan equal to a distance between the oppositely disposed wing tips, a centerline, and an airfoil over substantially its entire wingspan, the wing configured to allow it to be divided into a first part and a second part along its centerline, the first part and the second part being substantially mirror images of each other and comprising opposing wing roots at the centerline, the first part and the second part each having a leading edge extending from the wing root to a corresponding one of the wing tips, wherein the first part and the second part each have a span from the wing root to the corresponding wing tip equal to one-half the wingspan of the wing, wherein the fuselage and the wing are configurable in a first configuration provided by inserting the center section component into the center section cutout and joining it to the fuselage, dividing the wing into the first part and the second part, and connecting the wing roots of the first part and the second part to opposing sides of the center section component by a side-of-body join, wherein an effective wingspan of the aircraft in the first configuration is equal to twice the span of one of the first part and the second part; and a second configuration provided by not inserting the center section component into the center section cutout, inserting the wing into the center section cutout, and connecting the wing to the fuselage, the centerline of the wing being coincident with the centerline of the fuselage, a center portion of the airfoil of the wing being inside the fuselage, wherein the effective wingspan of the aircraft in the second configuration is equal to twice the span of one of the first part and the second part minus the fuselage width, and wherein a single common wing design for the first part and the second part is used in both the first configuration and the second configuration and the span of the first part and the second part is the same in both the first configuration and the second configuration.

21. The method of providing an aircraft structure of claim 20 and further comprising:

providing a selected pair of either a first pair of fuselage-wing fairings or a second pair of fuselage-wing fairings;

the first pair of fairings being configured to accommodate a first airfoil size for use with the first configuration;

the second pair of fairings being configured to accommodate a second airfoil size that is smaller than the first airfoil size for use with the second configuration; and further comprising connecting the selected fairings to both the fuselage and the wing.

22. The method of providing an aircraft structure of claim 20, wherein the aircraft comprises a pair of engines, the method further comprising providing the wing with a first pair of engine mounts at a first predetermined distance from its wing root and to which the engines are mounted in the first configuration, and a second pair of engine mounts at a second, different predetermined distance from said wing root and to which the engines are mounted in the second configuration.

23. The method of providing an aircraft structure of claim 20 wherein inserting the center section component comprises inserting a wingbox.

24. The method of providing an aircraft structure of claim 20 wherein providing a wing further comprises providing the wing with a pair of flaps wherein, in the first configuration, each flap has a first predetermined length and, in the second configuration, each flap has a second predetermined length that is shorter than the first predetermined length, and further comprising, in the second configuration, providing the wing with a pair of spacers having a third predetermined length, said first predetermined length being approximately the same as the sum of said second and third predetermined lengths.

* * * * *

UNITED STATES PATENT AND TRADEMARK OFFICE
CERTIFICATE OF CORRECTION

Page 1 of 1

PATENT NO. : 10,118,686 B2
APPLICATION NO. : 13/628117
DATED : November 6, 2018
INVENTOR(S) : Perry Nicholas Rea It is certified that error appears in the above-identified patent and that said Letters Patent is hereby corrected as shown below:

In the Claims

At Column 9, Lines 27-31, delete the entire paragraph:
"10. The aircraft structure of claim 9 wherein the second configuration, the wing also has a pair of spacers, each spacer having a third predetermined length, said first predetermined length being approximately the same as the sum of said second and third predetermined lengths.".

At Column 9, Line 32, delete the number "11" and substitute therefore --10--.

At Column 9, Line 39, delete the number "12" and substitute therefore --11--.

At Column 9, Line 39, delete the number "11" and substitute therefore --10--.

At Column 9, Line 42, delete the number "13" and substitute therefore --12--.

At Column 9, between Lines 43 and 44, add the paragraph:
--13. The aircraft structure of claim 8 wherein the wing has a pair of flaps on opposing sides of the centerline of the wing, wherein the flaps have a first predetermined length in the first configuration and the flaps have a second predetermined length in the second configuration that is shorter than the first predetermined length.--.

Signed and Sealed this
Eleventh Day of December, 2018

Andrei Iancu
*Director of the United States Patent and Trademark Office*